(12) United States Patent
Zhang et al.

(10) Patent No.: US 12,362,671 B2
(45) Date of Patent: Jul. 15, 2025

(54) SWITCHING POWER SUPPLY CIRCUIT

(71) Applicant: Silergy Semiconductor Technology (Hangzhou) LTD, Hangzhou (CN)

(72) Inventors: Xiahe Zhang, Hangzhou (CN); Jian Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 283 days.

(21) Appl. No.: 17/983,543

(22) Filed: Nov. 9, 2022

(65) Prior Publication Data
US 2023/0155510 A1  May 18, 2023

(30) Foreign Application Priority Data

Nov. 15, 2021 (CN) .......................... 202111349904.1

(51) Int. Cl.
*H02M 3/158* (2006.01)
*H02M 1/00* (2006.01)
(Continued)

(52) U.S. Cl.
CPC ....... *H02M 3/1588* (2013.01); *H02M 1/0032* (2021.05); *H02M 3/01* (2021.05); *H02M 3/33571* (2021.05); *H02M 7/217* (2013.01)

(58) Field of Classification Search
CPC ........... H02M 1/0032; H02M 3/33529; H02M 3/33546; H02M 3/33553; H02M 3/33561; H02M 3/33569; H02M 3/33571; H02M 3/33573; H02M 3/33576; H02M 3/33584; H02M 3/33592; H02M 7/155; H02M 7/1552; H02M 7/1555; H02M 7/1557; H02M 7/162; H02M 7/1623; H02M 7/1626; H02M 7/17; H02M 7/19; H02M 7/21; H02M 5/2573; H02M 1/081; H02M 5/293; H02M 7/12; H02M 3/10; H02M 3/125; H02M 3/13; H02M 3/135; H02M 3/145;
(Continued)

(56) References Cited

U.S. PATENT DOCUMENTS 6,005,780 A    12/1999  Hua
6,580,258 B2    6/2003  Wilcox et al.
(Continued)

FOREIGN PATENT DOCUMENTS

CN    102231605 A    11/2011
CN    103280965 A     9/2013
(Continued)

*Primary Examiner* — Jeffrey A Gblende

(57) ABSTRACT

A switching power supply circuit can include: a transformer having a primary winding and a secondary winding; a resonant capacitor and a resonant inductor coupled in series with the primary winding to form a series structure; a power switch module receiving an input voltage and connecting two terminals of the series structure to form a resonance circuit; an output rectification module coupled to the secondary winding and generating an output voltage; an operating mode control module receiving the input voltage and the output voltage, to control the output rectification module such that the switching power supply circuit is operated in the LLC mode or the AHB mode based on a ratio of the input voltage and the output voltage relative to a predetermined value.

9 Claims, 14 Drawing Sheets

(51) Int. Cl.
*H02M 3/00* (2006.01)
*H02M 3/335* (2006.01)
*H02M 7/217* (2006.01)

(58) Field of Classification Search
CPC ........ H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/4225; H02M 7/217; H02M 1/0025; H02M 1/0045; H02M 1/0009; H02M 1/08; H02M 1/088; H02M 1/0048; H02M 3/22; H02M 1/36; H02M 3/24; H02M 3/325; H02M 3/335; H02M 3/28; H02M 3/01; H02M 3/33507; H02M 2007/4815; H02M 2007/4818; H02M 1/083; H02M 3/33538; H02M 3/33515; H02M 3/33523; H02M 1/4233; H02M 1/12; H02M 3/07; H02M 7/219; H02M 7/4815; H02M 7/4818; H02M 7/4826; H02M 7/4833; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069; Y02B 70/1491
See application file for complete search history.

(56) References Cited

U.S. PATENT DOCUMENTS

| | | | |
|---|---|---|---|
| 9,160,242 B2 * | 10/2015 | Sanuki | H02M 3/01 |
| 9,325,254 B2 | 4/2016 | Deng et al. | |
| 9,331,588 B2 | 5/2016 | Chen | |
| 9,488,680 B2 | 11/2016 | Xu | |
| 9,997,996 B1 * | 6/2018 | Halberstadt | H02M 3/33546 |
| 2012/0169313 A1 | 7/2012 | Lee | |
| 2014/0078789 A1 | 3/2014 | Li et al. | |
| 2014/0239934 A1 | 8/2014 | Zhang | |
| 2015/0160270 A1 * | 6/2015 | Shi | H02M 3/33515 363/21.13 |
| 2015/0263631 A1 * | 9/2015 | Matsuura | H02M 3/33576 363/21.02 |
| 2015/0280578 A1 | 10/2015 | Huang et al. | |
| 2017/0155325 A1 * | 6/2017 | Shimada | H02M 3/3376 |
| 2021/0091678 A1 | 3/2021 | Wang | |
| 2021/0242786 A1 * | 8/2021 | Deboy | H02M 3/33569 |

FOREIGN PATENT DOCUMENTS

| | | | | |
|---|---|---|---|---|
| CN | 106130378 A | | 11/2016 | |
| CN | 107947587 A | * | 4/2018 | ........ H02M 3/33576 |
| CN | 107947587 B | | 4/2018 | |
| CN | 107968569 A | | 4/2018 | |

* cited by examiner

SWITCHING POWER SUPPLY CIRCUIT

RELATED APPLICATIONS

This application claims the benefit of Chinese Patent Application No. 202111349904.1, filed on Nov. 15, 2021, which is incorporated herein by reference in its entirety.

FIELD OF THE INVENTION

The present invention generally relates to the field of power electronics, and more particularly to switching power supply circuitry.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switching power supply uses modern power electronics technology to control the time ratio of turning on and off the switch to maintain a stable output voltage. Switching power supplies generally include pulse-width modulation (PWM) control ICs and MOSFETs. With the development and innovation of the power electronics technology, switching power supply technology continues to be innovated. Switching power supplies are widely used in many electronic devices due to its characteristics of small size, light weight, and high efficiency, and is an indispensable power supply for the rapid development of the electronic information industry.

Inductor-inductor-capacitor (LLC) topology and asymmetrical half-bridge (AHB) topology are two common topologies for switching power supplies. Among them, LLC topology uses the structure of the resonant inductance, the excitation inductance, and the resonant capacitor in series, which has high efficiency. However, the frequency can change too much when applied in a wide range, and the efficiency can be sacrificed if the control of LLC topology is not suitable. The input and output of the AHB topology may achieve a relatively wide range. Nevertheless, when AHB topology is fully loaded, the transformer may only transfer the load energy during a portion of the time, and the efficiency may be slightly lower than that of the LLC. Accordingly, AHB topology is not suitable for the conditions that require relatively high power density and efficiency. In particular embodiments, a wide input and output voltage range can be satisfied, along with high system efficiency of the switching power supply.

Figure 1:
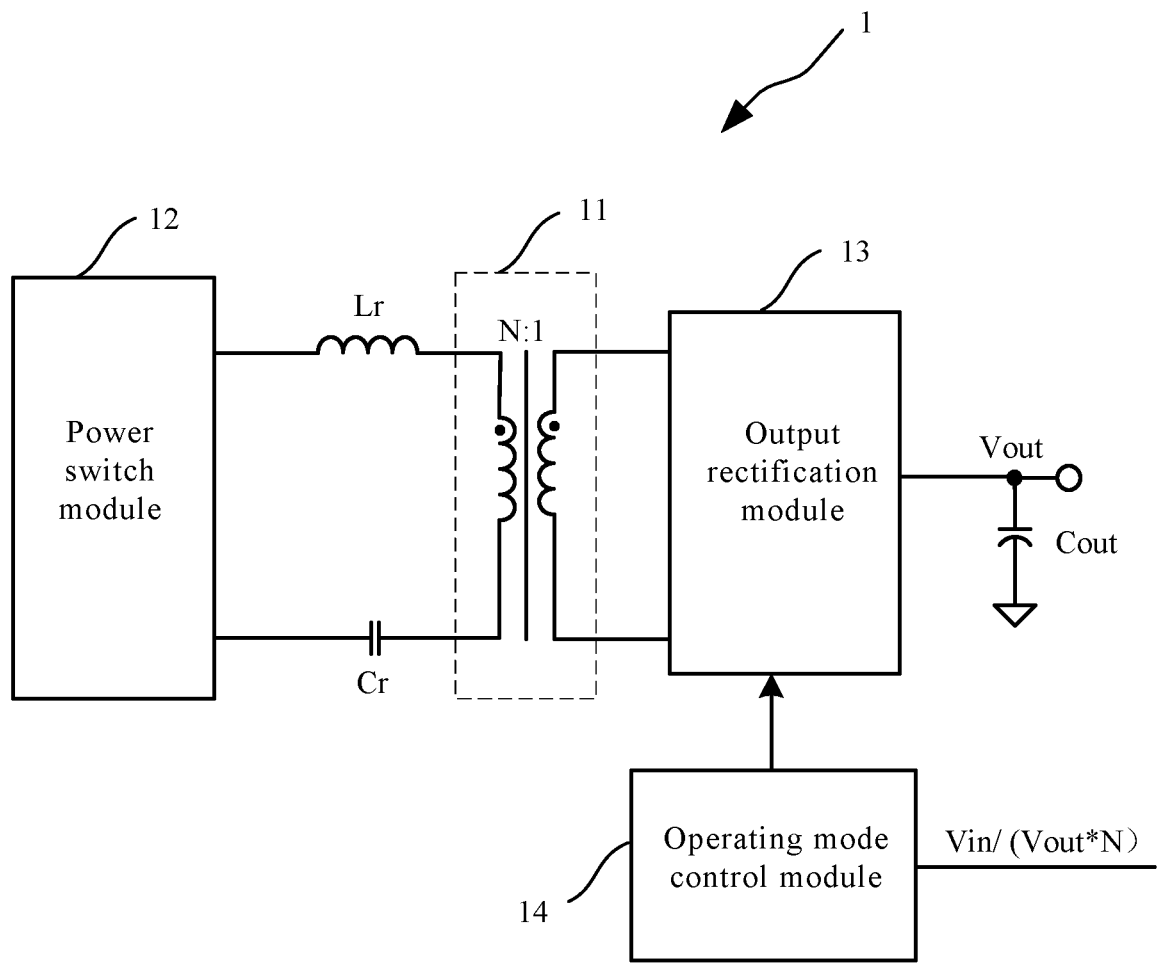
FIG. 1 is a schematic block diagram of a switching power supply circuit, in accordance with embodiments of the present invention.

Referring now to FIG. 1, shown is a schematic block diagram of a switching power supply circuit, in accordance with embodiments of the present invention. In this particular example, switching power supply circuit 1 can include transformer 11, resonant capacitor Cr, resonant inductor Lr, power switch module 12, output rectification module 13, and operating mode control module 14. Transformer 11 can include a primary winding and a secondary winding. For example, the structure and the number of the primary windings in transformer 11 can be determined by the structure of power switch module 12 (e.g., including a full bridge or a half bridge). The structure and the number of the secondary windings in transformer 11 may be determined by the structure of output rectification module 13 (e.g., including a full bridge or a half bridge).

Resonant capacitor Cr and resonant inductor Lr can connect in series with the primary winding to form a series structure. For example, resonant inductor Lr and resonant capacitor Cr can be located on two sides of the primary winding respectively. Resonant inductor Lr may be located on the high-voltage side, and resonant capacitor Cr on the low-voltage side. In some cases, resonant capacitor Cr, resonant inductance Lr, and the primary winding can connect in series to form a resonant circuit with power switch module 12. Power switch module 12 may receive input voltage Vin and couple two terminals of the series structure to form the resonant circuit. For example, power switch module 12 can include a plurality of power switches to form a half-bridge structure or full-bridge structure.

Output rectification module 13 can connect to the secondary winding and can generate an output voltage. For example, output rectification module 13 can include a half-bridge rectification structure or a full-bridge rectification structure, which may be set according to actual needs. Operating mode control module 14 may receive input voltage Vin and output voltage Vout, and can control output rectification module 13 to switch the operating mode based on the ratio of input voltage Vin to output voltage Vout. For example, when the ratio of the input voltage Vin to the output voltage Vout is less than or equal to a predetermined value, output rectification module 13 can be controlled such that the switching power supply circuit operates in the LLC mode. When the ratio of input voltage Vin to output voltage Vout is greater than the predetermined value, output rectification module 13 can be controlled such that the switching power supply circuit operates in the AHB mode.

It should be noted that the predetermined value may be set according to particular requirements. In this example, the predetermined value is k*N, where N is the turns ratio of the primary winding to the secondary winding in the transformer. As an example, when the ratio of the input voltage Vin to the output voltage Vout is close to 2N, the switching power supply circuit may operate in the LLC mode. When the ratio of the input voltage Vin to the output voltage Vout is much larger than 2N, the switching power supply circuit may operate in the AHB mode, and k can optionally be set to be a real number less than or equal to 5, 6, 7, 8, 9 or 10. The ratio of input voltage Vin to output voltage Vout for operating in LLC mode and AHB mode may be determined according to particular applications, and then the value of k can be set.

Figure 2:
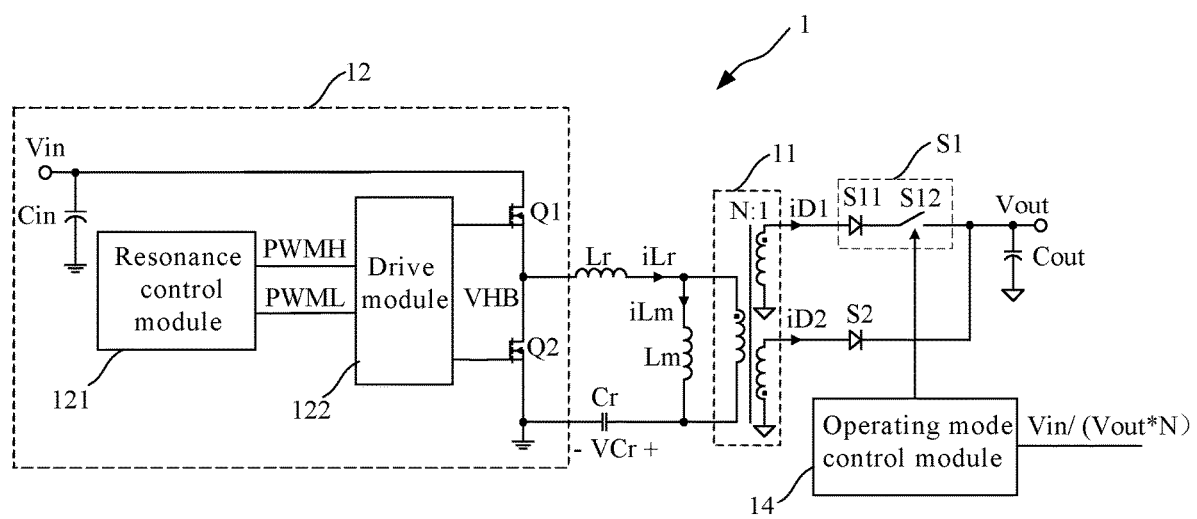
FIG. 2 is a schematic block diagram of the first example of the switching power supply circuit, in accordance with embodiments of the present invention.

Referring now to FIG. 2, shown is a schematic block diagram of the first example of the switching power supply circuit, in accordance with embodiments of the present invention. In this particular example, switching power supply circuit 1 can include transformer 11, resonant capacitor Cr, resonant inductor Lr, power switch module 12, output rectification module 13, and operating mode control module 14 (e.g., a controller).

For example, power switch module 12 is a half-bridge structure, which can include power switches Q1 and Q2 connected in series between input voltage Vin and the reference ground. The first terminal of power switch Q1 may receive the input voltage Vin, and the second terminal of power switch Q1 can connect to the first terminal of power switch Q2. The second terminal of power switch Q2 is grounded. The second terminal of power switch Q1 and the first terminal of power switch Q2 may be grounded through resonant inductor Lr, the primary winding of the transformer 11, and resonant capacitor Cr in sequence (both terminals of the primary winding can also connect in parallel with a magnetizing inductor Lm) to form a resonant circuit. In this example, power switch module 12 can also include resonance control module 121 and drive module 122. Resonance control module 121 can generate the switch control signals (e.g., PWMH and PWML). Drive module 122 can drive the control terminals of power switches Q1 and Q2 according to the switch control signals. Power switches Q1 and Q2 can be complementarily turned on. In this example, power switches Q1 and Q2 can be NMOS transistors.

As another example, power switch module 12 is a full-bridge structure, including third, fourth, fifth, and sixth power switches. The third and fourth power switches can connect in series between the input voltage and the reference ground. The fifth and sixth power switches can connect in series between the input voltage and the reference ground. The control terminals of the third, fourth, fifth, and sixth power switches may receive the switch control signals. The first terminal of the series structure can connect to the connection node of the third and fourth power switches, and may pass through resonant inductor Lr, the primary winding of transformer 11, and the resonant capacitor Cr in sequence for connecting to the connection node of the fifth and sixth power switches.

As shown in FIG. 2, transformer 11 can include a primary winding, a first secondary winding, and a second secondary winding. A half-bridge rectification structure can be used by output rectification module 13. In this particular example, output rectification module 13 can include switch units S1 and S2. The current input terminal of switch unit S1 can connect to the dotted terminal of the first secondary winding and the primary winding, and the current output terminal of switch unit S1 can connect to the upper plate of output capacitor Cout. When the switching power supply circuit 1 is in the LLC mode, switch unit S1 can be turned on and may rectify the signal input to switch unit S1. When the switching power supply circuit 1 is in the AHB mode, switch unit S1 can be turned off. The current input terminal of switch unit S2 can connect to the non-dotted terminal of the second secondary winding and the primary winding, and the current output terminal of switch unit S2 can connect to the upper plate of output capacitor Cout. When the switching power supply circuit 1 is in the LLC mode, and when the switching power supply circuit 1 is in the AHB mode, the signal input to switch unit S2 may be rectified. The lower plate of output capacitor Cout, the non-dotted terminal of the first secondary winding and the primary winding, and the dotted terminal of the second secondary winding and the primary winding can be grounded.

For example, switch unit S1 can include switches S11 and S12 connected in series. Switch S11 is a switch in a high-speed control mode, and switch S12 is a switch in the low-speed control mode. In other words, the operating frequency of switch S12 is lower than the operating frequency of switch S11. Switch S11 can include a synchronous rectification switch and a rectification diode, whereby a diode may be regarded as an uncontrolled switch. Switch S12 can include a relay and a semiconductor switch. For example, switch S11 is a rectification diode, and switch S12 is a semiconductor switch. The anode of the rectification diode may serve as the current input terminal of switch unit S1. The cathode of the rectification diode can connect to one terminal of the semiconductor switch, and the other terminal of the semiconductor switch may serve as the current output terminal of switch unit S1. In this example, the rectification diode is used for rectification, and the semiconductor switch is controlled by operating mode control module 14 to switch the operating mode.

Figure 3:
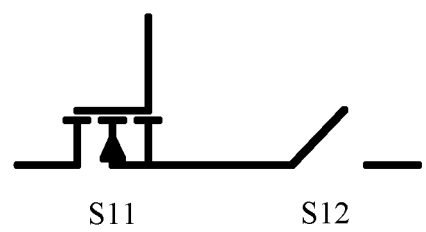
FIG. 3 is a schematic diagram of an example of the first switch unit, in accordance with embodiments of the present invention.

Referring now to FIG. 3, shown is a schematic diagram of an example of the first switch unit, in accordance with embodiments of the present invention. In this particular example, switch S11 is a synchronous rectification switch, and switch S12 is a semiconductor switch. The drain of the synchronous rectification switch may serve as the current input terminal of switch unit S1. The source of the synchronous rectification switch can connect to one terminal of the semiconductor switch, and the other terminal of the semiconductor switch may serve as the current output terminal of switch unit S1. In this example, the synchronous rectification switch is used for rectification, and switch is controlled by operating mode control module 14 to switch the operating mode. The positions of the semiconductor switch and the synchronous rectification switch may be interchanged in some cases. In particular embodiments, switch unit S1 can be a bidirectional switch including two synchronous rectification switches connected in series with opposite direction.

Figure 4:
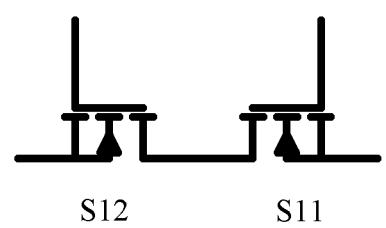
FIG. 4 is a schematic diagram of another example of the first switch unit, in accordance with embodiments of the present invention.

Referring now to FIG. 4, shown is a schematic diagram of another example of the first switch unit, in accordance with embodiments of the present invention. In this particular example, the source of synchronous rectification switch S12 may serve as the current input terminal of switch unit S1. The drain of synchronous rectification switch S12 can connect to the drain of synchronous rectification switch S11. The source of synchronous rectification switch S11 may serve as the current output terminal of switch unit S1. In this example, synchronous rectification switch S11 (e.g., the parasitic diode) can be used for rectification. Synchronous rectification switch S12 can be controlled by operating mode control module 14 to switch operating modes (e.g., both S11 and S12 are turned off when operated in the AHB mode).

Figure 5:
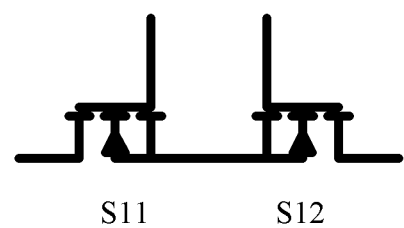
FIG. 5 is a schematic diagram of yet another example of the first switch unit, in accordance with embodiments of the present invention.

Referring now to FIG. 5, shown is a schematic diagram of yet another example of the first switch unit, in accordance with embodiments of the present invention. In this particular example, the positions of the first synchronous rectification switch S11 the synchronous rectification switch S12 may be interchanged. For example, switch unit S2 is a rectification diode. As another example, switch unit S2 is a synchronous rectification switch. Here, the N-type synchronous rectification switch is taken as an example. In other cases, the corresponding device type of switch unit S2 may be selected based on particular requirements, and the connection relationship may suitably be adjusted. Any switch capable of realizing the above-mentioned rectification function and the mode switching function can be utilized in certain embodiments.

As shown in FIG. 2, operating mode control module 14 can generate a mode switching signal based on Vin/(Vout*N) to control switching power supply circuit 1 to operate in different modes. For example, power switch module 12 is a half-bridge structure, the rectification diode and a semiconductor switch are used as switch unit S1, and the rectification diode is used as switch unit S2.

Figure 6:
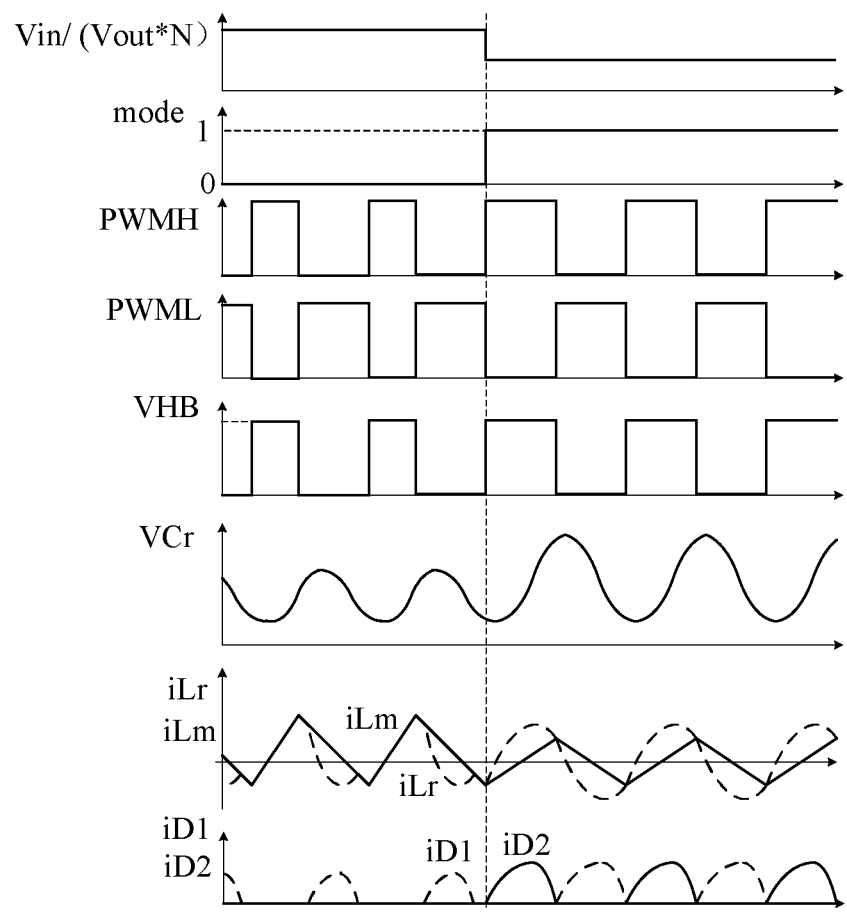
FIG. 6 is a schematic diagram of the waveforms on each node of the first example of the switching power supply circuit, in accordance with embodiments of the present invention.

Referring now to FIG. 6, shown is a schematic diagram of the waveforms on each node of the first example of the switching power supply circuit, in accordance with embodiments of the present invention. In this particular example, with the switching of switch control signals PWMH and PWML, voltage VHB of a middle node between the second terminal of power switch Q1 and at the first terminal of power switch Q2, voltage VCr on the resonance capacitor Cr, current iLr on resonant inductor Lr, and current iLm on magnetizing inductor Lm can increase or decrease correspondingly.

Figure 7:
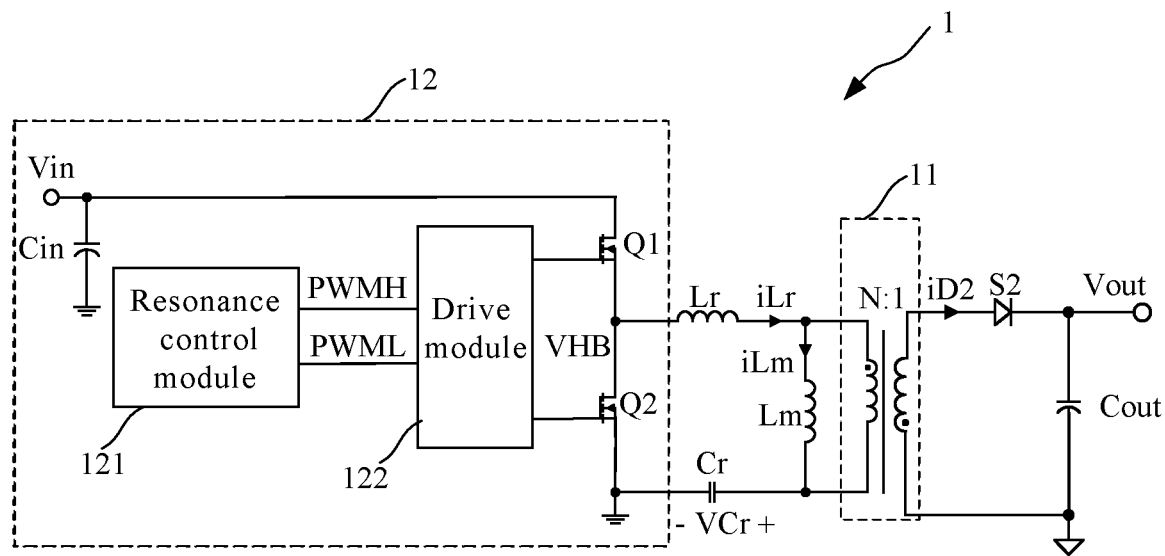
FIG. 7 is a schematic block diagram of the first example of the switching power supply circuit operated in the AHB mode, in accordance with embodiments of the present invention.

Referring now to FIG. 7, shown is a schematic block diagram of the first example of the switching power supply circuit operated in the AHB mode, in accordance with embodiments of the present invention. As shown in FIGS. 6 and 7, e.g., when Vin/(Vout*N) is more than 2, the mode switching signal mode=0, switch S12 is turned off, and the switching power supply circuit 1 is operated in AHB mode. At this moment, the first secondary winding and the branch where the first switch is located can be disconnected and not operate. Only the second secondary winding and switch unit S2 may perform the rectification operation, and when power switch Q1 is turned off and power switch Q2 is turned on, current iD2 may flow through power switch Q2. In this way, advantages of a wide input and output range may be achieved.

Figure 8:
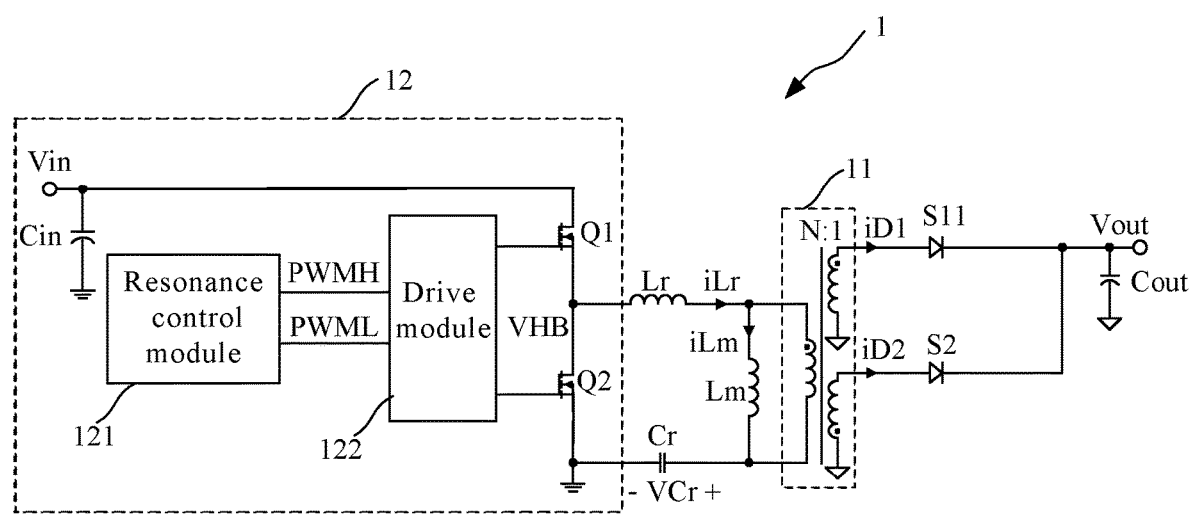
FIG. 8 is a schematic block diagram of the first example of the switching power supply circuit operated in the LLC mode, in accordance with embodiments of the present invention.

Referring now to FIG. 8, shown is a schematic block diagram of the first example of the switching power supply circuit operated in the LLC mode, in accordance with embodiments of the present invention. As shown in FIGS. 6 and 8, e.g., when Vin/(Vout*N) is close to 2, the mode switching signal mode=1, switch S12 is turned on, and switching power supply circuit 1 may operate in the LLC mode. At this moment, the branch where the first secondary winding and the first switch are located, and the branch where the second secondary winding and switch unit S2 are located, may all perform the rectification operation. Also, when the current in the primary winding flows into the dotted terminal, current iD1 may flow through switch unit S1. When the current in the primary winding flows out of the dotted terminal, current iD2 may flow through switch unit S2, in order to provide relatively high efficiency.

Figure 9:
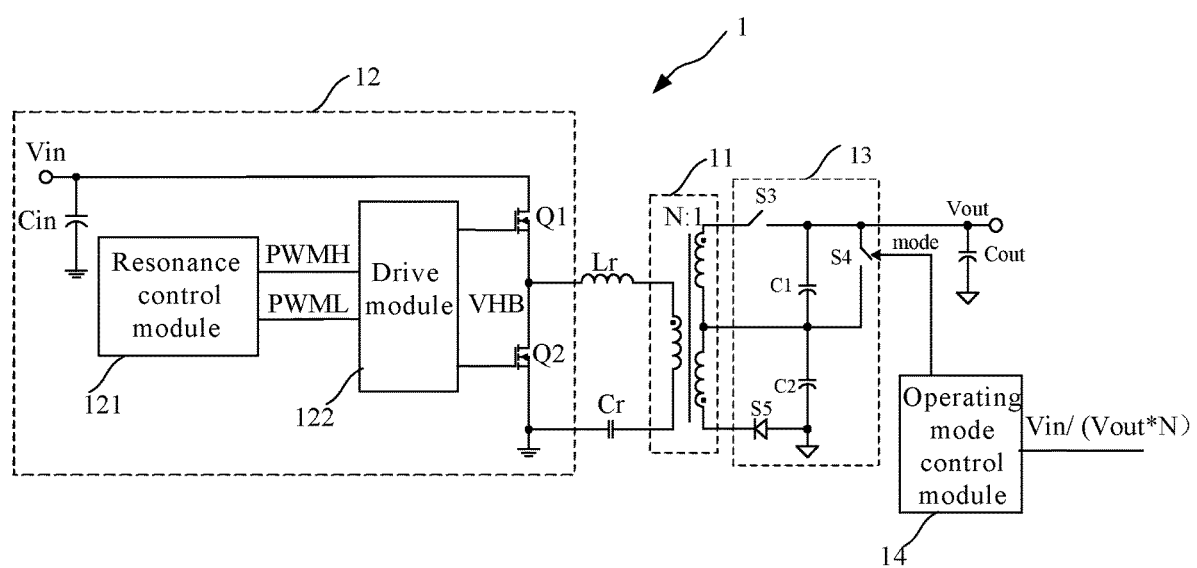
FIG. 9 is a schematic block diagram of the second example of the switching power supply circuit, in accordance with embodiments of the present invention.

Referring now to FIG. 9, shown is a schematic block diagram of the second example of the switching power supply circuit, in accordance with embodiments of the present invention. In this particular example, the structure of output rectification module 13 is different. As shown, the secondary winding can include a third and fourth secondary windings. Output rectification module 13 can include switch units S3, S4, S5, capacitor C1, and capacitor C2. The current input terminal of switch unit S3 can connect to the dotted terminal of the third secondary winding. The current output terminal of switch unit S3 can connect to output capacitor Cout and the upper plate of capacitor C1. In the LLC mode, switch unit S3 can be turned on and may rectify the signal input to switch unit S3. In the AHB mode, switch unit S3 can be turned off. The lower plate of capacitor C1 can connect to the non-dotted terminal of the third secondary winding. Switch unit S4 can connect in parallel with both terminals of capacitor C1.

In the LLC mode, switch unit S4 can be turned off. In the AHB mode, switch unit S4 can be turned on. The current input terminal of switch unit S5 may be grounded. The current output terminal of switch unit S5 can connect to the dotted terminal of the fourth secondary winding. In both the LLC mode and the AHB mode, the signal input to switch unit S5 can be rectified. The upper plate of capacitor C2 can connect to the non-dotted terminal of the fourth secondary winding. The lower plate of capacitor C2 may be grounded, and the lower plate of output capacitor Cout is grounded.

The non-dotted terminal of the third secondary winding can connect to the non-dotted terminal of the fourth secondary winding.

For example, switch unit S3 is a bidirectional switch having two synchronous rectification switches connected in series in opposite phases. In another example, switch unit S3 is a series structure of a high-speed control mode switch and a low-speed control mode switch, and the operating frequency of the low-speed control mode switch is less than the operating frequency of the high-speed control mode switch. For example, the high-speed control mode switch may be a synchronous rectification switch or a rectification diode, and the low-speed control mode switch can be a relay or a semiconductor switch. For example, switch unit S4 can include a relay and a semiconductor switch. Any device capable of switching the mode may be suitable in certain embodiments. For example, switch unit S5 can include a synchronous rectification switch and a rectification diode. Any device capable of realizing a rectification function may be utilized in certain embodiments.

Figure 10:
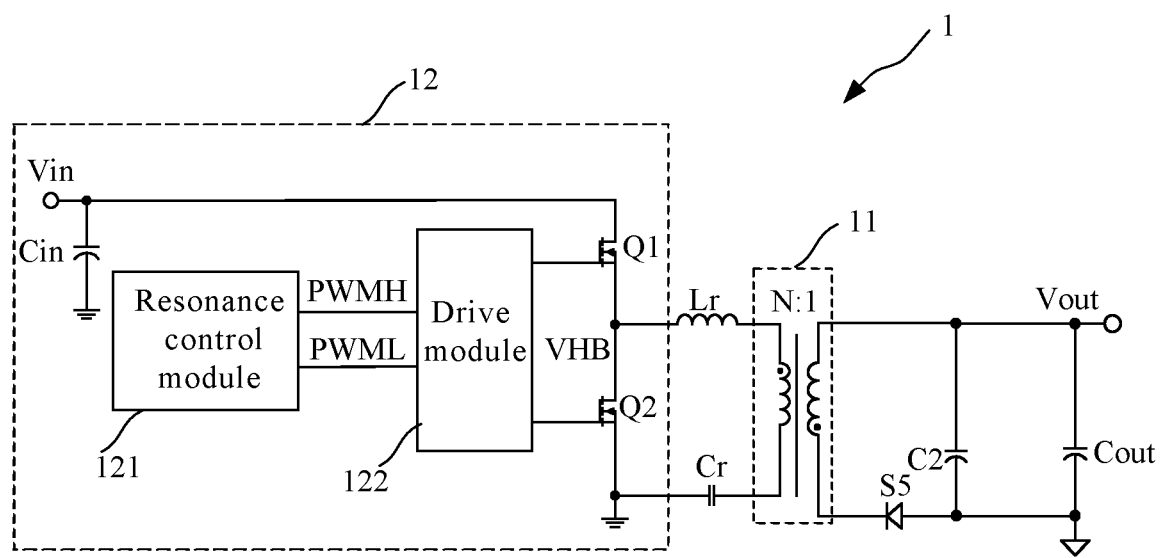
FIG. 10 is a schematic block diagram of the second example of the switching power supply circuit operated in the AHB mode, in accordance with embodiments of the present invention.

Referring now to FIG. 10, shown is a schematic block diagram of the second example of the switching power supply circuit operated in the AHB mode, in accordance with embodiments of the present invention. In this particular example, taking switch unit S3 as an example of a series structure of a rectification diode and a semiconductor switch, when Vin/(Vout*N) is more than 2, the mode switching signal mode=0. The slow control mode switch in switch unit S3 can be turned off, and switch unit S4 turned on. Switching power supply circuit 1 can be operated in the AHB mode. At this moment, the branch where the third secondary winding and switch unit S3 are located can be disconnected and not operate. Only the fourth secondary winding and switch unit S5 may perform the rectification operation.

Figure 11:
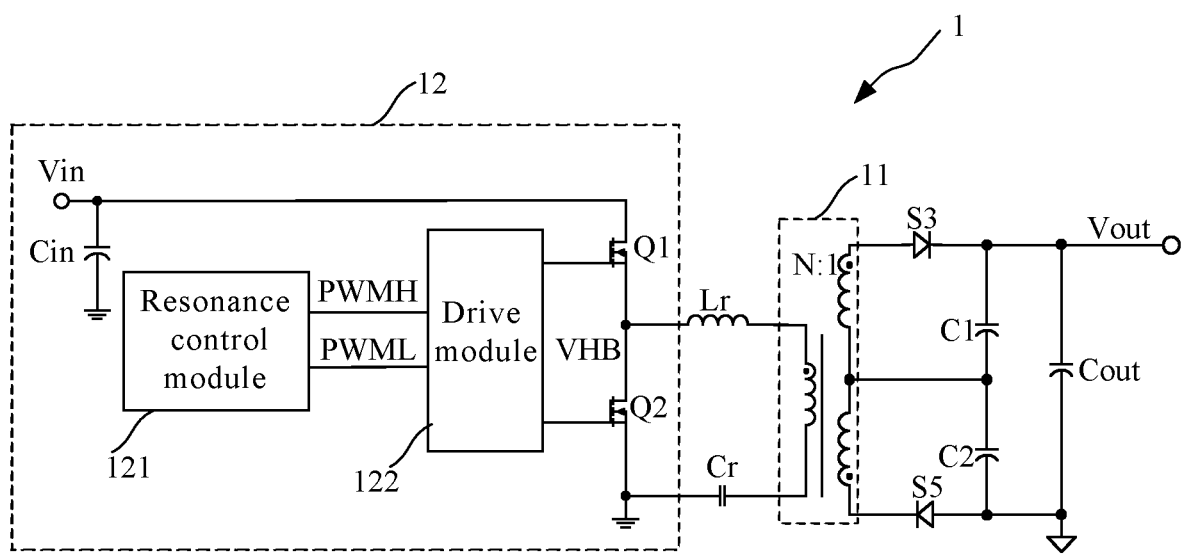
FIG. 11 is a schematic block diagram of the second example of the switching power supply circuit operated in the LLC mode, in accordance with embodiments of the present invention.

Referring now to FIG. 11, shown is a schematic block diagram of the second example of the switching power supply circuit operated in the LLC mode, in accordance with embodiments of the present invention. In this particular example, when Vin/(Vout*N) is close to 2, the mode switching signal mode=1. The slow control mode switching switch in switch unit S3 can be turned on, and switch unit S4 disconnected. Switching power supply circuit 1 can be operated in the LLC mode. At this moment, the third secondary winding, switch unit S3, the fourth secondary winding, and switch unit S5 may operate. Output voltage Vout can be the sum of the voltages on capacitors C1 and C2. Also, the circuit on the output side of switching power supply circuit 1 is a double-voltage rectification circuit.

Figure 12:
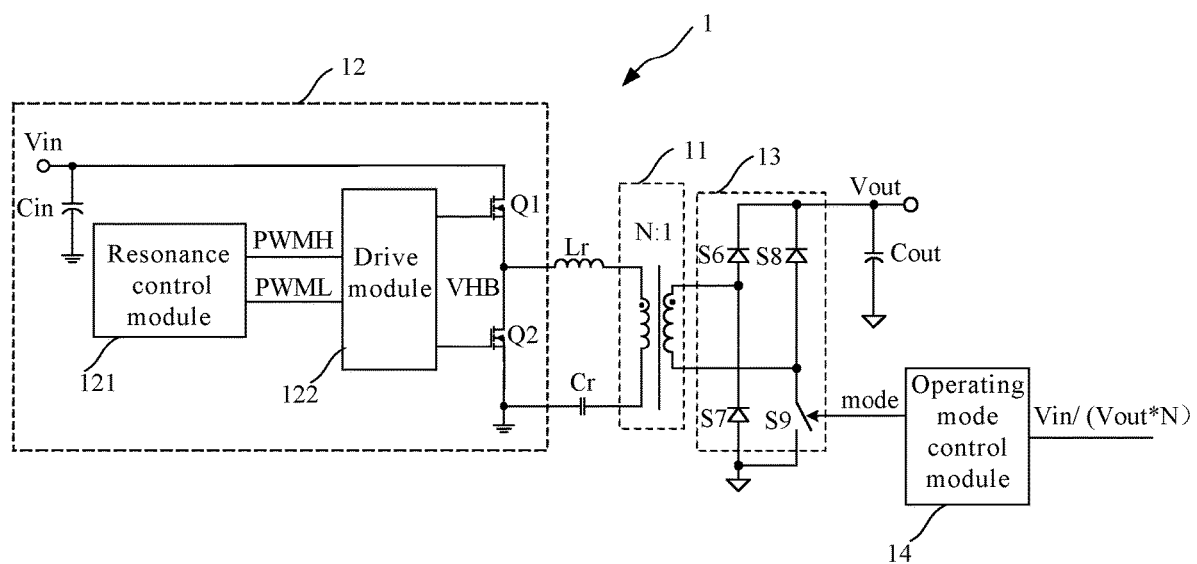
FIG. 12 is a schematic block diagram of the third example of the switching power supply circuit, in accordance with embodiments of the present invention.

Referring now to FIG. 12, shown is a schematic block diagram of the third example of the switching power supply circuit, in accordance with embodiments of the present invention. In this particular example, rectification module 13 can include switch units S6, S7, S8, and S9. The current input terminal of switch unit S6 can connect to the dotted terminal of the fifth secondary winding. The current output terminal of switch unit S6 can connect to the upper plate of output capacitor Cout. In both the LLC mode and the AHB mode, the signal input to switch unit S6 can be rectified. The current input terminal of switch unit S7 may be grounded, and the current output terminal of switch unit S7 can connect to the current input terminal of switch unit S6.

In both the LLC mode and the AHB mode, the signal input to switch unit S7 can be rectified. The current input terminal of switch unit S8 can connect to the non-dotted terminal of the fifth secondary winding. The current output terminal of switch unit S8 can connect to the upper plate of output capacitor Cout. In both the LLC mode and the AHB mode, the signal input to switch unit S8 can be rectified, and the current input terminal of switch unit S9 may be grounded. The current output terminal of switch unit S9 can connect to the current input terminal of switch unit S8. When switching power supply circuit 1 is in the LLC mode, switch unit S9 can be turned on and may rectify the signal input to switch unit S9. When switching power supply circuit 1 is in the AHB mode, switch unit S9 can be turned off, and the lower plate of output capacitor Cout may be grounded.

For example, switch units S6, S7, and S8 can each include a synchronous rectification switch and a rectification diode. Any device capable of realizing a rectification function can be utilized in certain embodiments. It should be noted that the device types of switch units S6, S7, and S8 may be the same or different. For example, switch unit S9 is a bidirectional switch having two synchronous rectification switches connected in series in opposite direction. In another example, switch unit S9 is a series structure of a high-speed control mode switch and a low-speed control mode switch, and the operating frequency of the low-speed control mode switch is less than the operating frequency of the high-speed control mode switch. For example, the high-speed control mode switch may be a synchronous rectification switch or a rectification diode, and the low-speed control mode switch can be a relay or a semiconductor switch.

Figure 13:
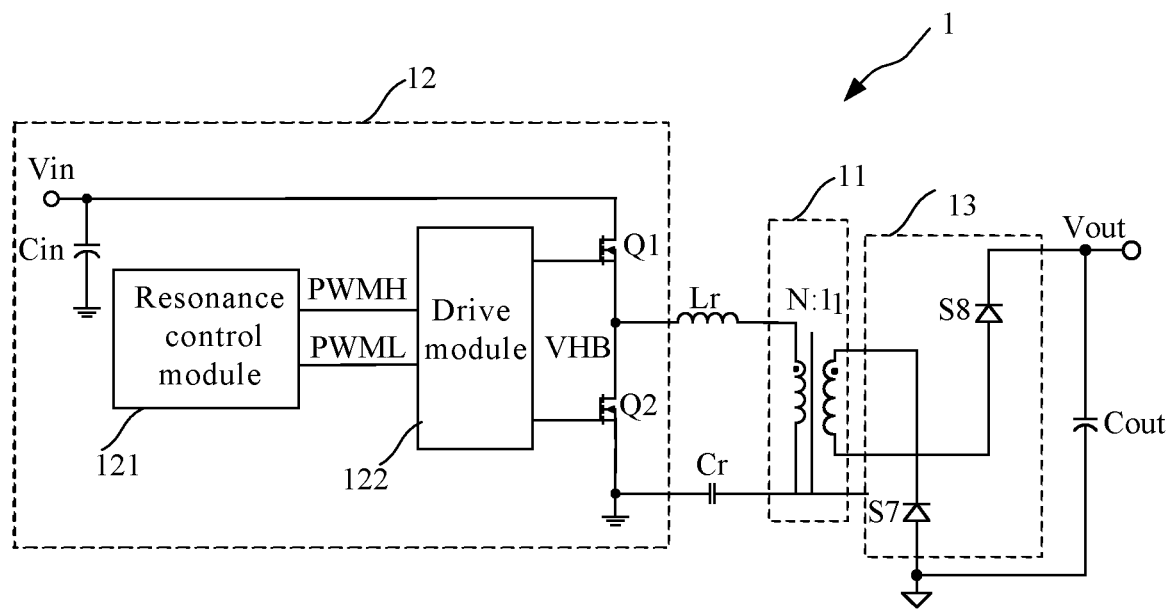
FIG. 13 is a schematic block diagram of the third example of the switching power supply circuit operated in the AHB mode, in accordance with embodiments of the present invention.

Referring now to FIG. 13, shown is a schematic block diagram of the third example of the switching power supply circuit operated in the AHB mode, in accordance with embodiments of the present invention. In this particular example, switch units S6, S7, and S8 are the rectification diodes, and switch unit S9 is a series structure of a rectification diode and a semiconductor switch, whereby when Vin/(Vout*N) is more than 2, the mode switching signal mode=0. The slow control mode switch in switch unit S9 can be turned off. Switching power supply circuit 1 may be operated in AHB mode. When the current of the primary winding flows out from the dotted terminal, the current can pass from the non-dotted terminal of the fifth secondary winding through switch unit S8, output capacitor Cout, switch unit S7 in sequence, and may return to the dotted terminal of the fifth secondary winding, thereby realizing rectification output.

Figure 14:
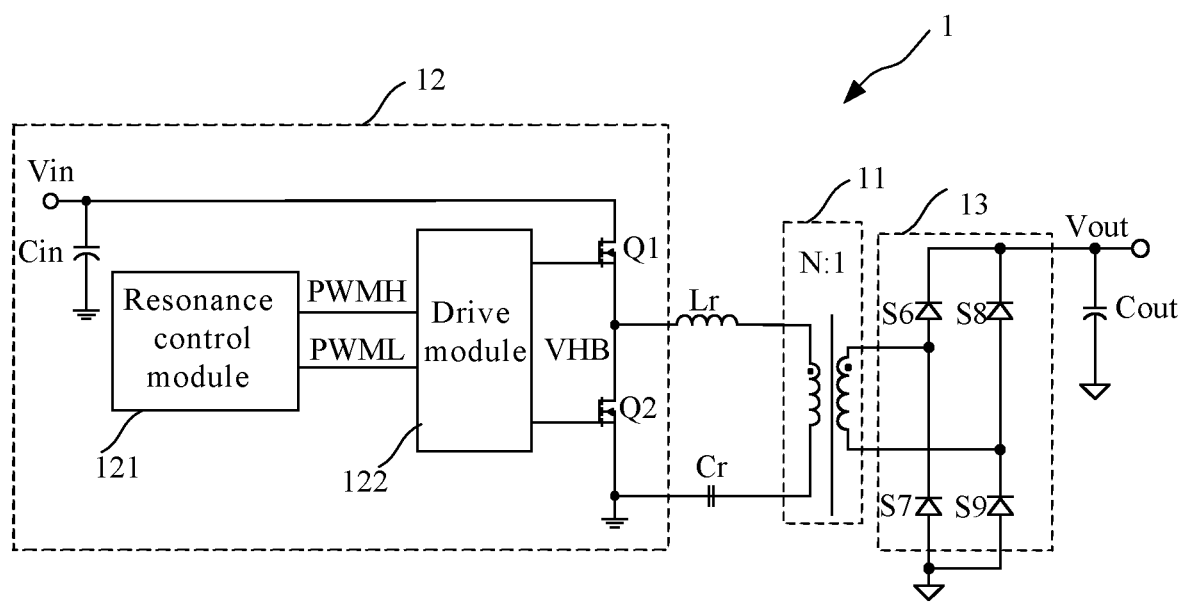
FIG. 14 is a schematic block diagram of the third example of the switching power supply circuit operated in the LLC mode, in accordance with embodiments of the present invention.

Referring now to FIG. 14, shown is a schematic block diagram of the third example of the switching power supply circuit operated in the LLC mode, in accordance with embodiments of the present invention. In this particular example, when Vin/(Vout*N) is close to 2, the mode switching signal mode=1. The slow control mode switching switch in switch unit S9 can be turned on, and switching power supply circuit 1 may be operated in LLC mode. When the current of the primary winding flows out from the dotted terminal, the current can pass from the non-dotted terminal of the fifth secondary winding through switch unit S8, output capacitor Cout, switch unit S7 in sequential, and return to the dotted terminal of the fifth secondary winding. When the current of the primary winding flows into the dotted terminal, the current may pass from the dotted terminal of the fifth secondary winding through switch unit S6, output capacitor Cout, and switch unit S9 in sequence, and return to the non-dotted terminal of the fifth secondary winding, thereby realizing rectification output.

In particular embodiments, a switching power supply circuit can include: a transformer having a primary winding and a secondary winding; a resonant capacitor and a resonant inductor coupled in series with the primary winding to form a series structure; a power switch module configured to receive an input voltage and connecting two terminals of the series structure to form a resonance circuit; an output rectification module coupled to the secondary winding and configured to generate an output voltage; an operating mode control module configured to receive the input voltage and the output voltage, to control the output rectification module such that the switching power supply circuit is operated in the LLC mode when a ratio of the input voltage and the output voltage is less than or equal to a predetermined value, and to control the output rectification module such that the switching power supply circuit is operated in the AHB mode when the ratio of the input voltage and the output voltage is greater than the predetermined value. In this way, the topologies of AHB and LLC can effectively be unified, and allow the switching power supply circuit to have advantages of relatively high efficiency and wide input and output range as well by switching the topology operating modes.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A switching power supply circuit, comprising:
a) a transformer having a primary winding and a secondary winding;
b) a resonant capacitor and a resonant inductor coupled in series with the primary winding to form a series structure;
c) a power switch module configured to receive an input voltage and being coupled with two terminals of the series structure to form a resonance circuit;
d) an output rectification module coupled to the secondary winding and being configured to generate an output voltage;
e) an operating mode control module configured to receive the input voltage and the output voltage, and to generate a mode switching signal, wherein the output rectification module is controlled by the mode switching signal such that the switching power supply circuit is operated in an inductor-inductor-capacitor (LLC) mode when a ratio of the input voltage and the output voltage is less than or equal to a predetermined value, and the output rectification module is controlled such that the switching power supply circuit is operated in an asymmetrical half-bridge (AHB) mode when the ratio of the input voltage and the output voltage is greater than the predetermined value; and
f) wherein when in the AHB mode, the output rectification module only operates during either a positive half cycle or a negative half cycle of a resonance cycle, in order to provide energy to a load.

2. The switching power supply circuit of claim 1, wherein the power switch module comprises a first power switch and a second power switch coupled in series between the input voltage and a reference ground, control terminals of the first power switch and the second power switch receive switch control signals, a first terminal of the series structure is coupled to a connection node of the first power switch and the second power switch, and a second terminal of the series structure is grounded.

3. The switching power supply circuit of claim 1, wherein:
a) the power switch module comprises a third power switch, a fourth power switch, a fifth power switch, and a sixth power switch;
b) the third power switch and the fourth power switch are coupled in series between the input voltage and the reference ground, the fifth power switch and the sixth power switch are coupled in series between the input voltage and the reference ground, control terminals of the third power switch, the fourth power switch, the fifth power switch, and the sixth power switch receive the switch control signals; and
c) a first terminal of the series structure is coupled to a connection node of the third power switch and the fourth power switch, and a second terminal of the series structure is coupled to a connection node of the fifth power switch and the sixth power switch.

4. The switching power supply circuit of claim 1, wherein the predetermined value is k*N, wherein k is a real number less than or equal to 5, and N is a turns ratio of the primary winding and the secondary winding in the transformer.

5. The switching power supply circuit of claim 1, wherein:
a) the secondary winding comprises a first secondary winding and a second secondary winding;
b) the output rectification module comprises a first switch unit and a second switch unit;
c) a current input terminal of the first switch unit is coupled to a dotted terminal of the first secondary winding, and a current output terminal of the first switch unit is coupled to an upper plate of an output capacitor;
d) when the switching power supply circuit is operated in LLC mode, the first switch unit is turned on and a signal input to the first switch unit is rectified, and when the switching power supply circuit is operated in AHB mode, the first switch unit is turned off;
e) a current input terminal of the second switch unit is coupled to a non-dotted terminal of the second secondary winding, and a current output terminal of the second switch unit is coupled to the upper plate of the output capacitor;
f) when the switching power supply circuit is operated in the LLC mode, or when the switching power supply circuit is operated in the AHB mode, a signal input to the second switch unit is rectified; and
g) a lower plate of the output capacitor, a non-dotted terminal of the first secondary winding, and a dotted terminal of the second secondary winding are grounded.

6. The switching power supply circuit of claim 5, wherein the first switch unit is a bidirectional switch having two synchronous rectification switches coupled in series in opposite direction.

7. The switching power supply circuit of claim 5, wherein the first switch unit comprises a first switch and a second switch coupled in series, and an operating frequency of the second switch is less than an operating frequency of the first switch.

8. The switching power supply circuit of claim 7, wherein the first switch is a synchronous rectification switch or a rectification diode, and the second switch is a relay or a semiconductor switch.

9. The switching power supply circuit of claim 5, wherein the second switch unit is a synchronous rectification switch or a rectification diode.

* * * * *